US009244882B2

(12) United States Patent
Schneider

(10) Patent No.: US 9,244,882 B2
(45) Date of Patent: Jan. 26, 2016

(54) PROVISIONING NETWORK RESOURCES BASED ON ENVIRONMENT

(75) Inventor: James P. Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 1008 days.

(21) Appl. No.: 12/394,004

(22) Filed: Feb. 26, 2009

(65) Prior Publication Data
US 2010/0217841 A1  Aug. 26, 2010

(51) Int. Cl.
G06F 15/177 (2006.01)
(52) U.S. Cl.
CPC .................................. G06F 15/177 (2013.01)
(58) Field of Classification Search
CPC .............. H04L 69/329; H04L 67/1002; H04L 67/1008; H04L 67/1034; H04L 29/06027; G06F 15/177
USPC ................................. 709/220, 222, 223, 226
See application file for complete search history.

(56) References Cited

U.S. PATENT DOCUMENTS

| 6,070,191 A * | 5/2000 | Narendran et al. ........... 709/226 |
| 7,197,574 B1 * | 3/2007 | Ishiyama .......... H04L 29/12066 709/223 |
| 7,284,062 B2 * | 10/2007 | Krantz et al. ................. 709/229 |
| 8,850,442 B2 * | 9/2014 | Davis .................... G06F 9/5077 709/226 |
| 8,893,146 B2 * | 11/2014 | Muppirala ..................... 709/224 |
| 2002/0152305 A1 * | 10/2002 | Jackson et al. ................ 709/224 |
| 2002/0184529 A1 * | 12/2002 | Foster .................... H04L 49/357 726/4 |
| 2003/0115570 A1 | 6/2003 | Bisceglia |
| 2004/0249939 A1 | 12/2004 | Amini et al. |
| 2005/0251573 A1 * | 11/2005 | Merkow et al. ............... 709/226 |
| 2006/0002294 A1 * | 1/2006 | Chapman et al. ............. 370/229 |
| 2006/0047813 A1 * | 3/2006 | Aggarwal et al. ............ 709/226 |
| 2006/0104220 A1 * | 5/2006 | Yamazaki et al. ............ 370/254 |
| 2006/0164992 A1 * | 7/2006 | Brown et al. .................. 370/235 |
| 2006/0179116 A1 * | 8/2006 | Speeter et al. ................ 709/217 |
| 2006/0200658 A1 * | 9/2006 | Penkethman ..................... 713/2 |
| 2007/0038994 A1 | 2/2007 | Davis et al. |
| 2007/0116234 A1 * | 5/2007 | Schneider et al. ............ 379/219 |
| 2008/0063003 A1 * | 3/2008 | O'Neal ......................... 370/408 |
| 2008/0114770 A1 * | 5/2008 | Chen et al. ....................... 707/10 |
| 2008/0208958 A1 * | 8/2008 | Huff et al. ...................... 709/203 |
| 2008/0235266 A1 * | 9/2008 | Huang et al. .................. 707/102 |
| 2009/0003574 A1 * | 1/2009 | Schneider et al. ........ 379/201.12 |
| 2009/0007091 A1 * | 1/2009 | Appiah et al. ................. 717/171 |
| 2009/0043999 A1 | 2/2009 | Hatasaki et al. |
| 2010/0217841 A1 * | 8/2010 | Schneider ..................... 709/220 |
| 2011/0029599 A1 | 2/2011 | Pulleyn et al. |

OTHER PUBLICATIONS

Red Hat, Inc. "Red Hat Command Center: Users Guide 3.18", 2007, 318 pages.

(Continued)

Primary Examiner — Phuoc Nguyen
Assistant Examiner — Davoud Zand
(74) Attorney, Agent, or Firm — Lowenstein Sandler LLP

(57) ABSTRACT

A network appliance sends a configuration request to multiple different servers, each of which is associated with a different environment. A response is received from at least one server. Each received response includes configuration data that pertains to an environment associated with the server from which the response is received. The network appliance is then configured based on the configuration data included in the response to enable the network appliance to operate in the environment associated with the server from which the response originated.

13 Claims, 7 Drawing Sheets

(56) References Cited

OTHER PUBLICATIONS

Red Hat, Inc. "Red Hat Command Center 3.18: Check Reference", 2007, 178 pages.
Red Hat, Inc. "Red Hat Command Center 3.18: Setup and Installation Guide", 2007, 33 pages.
Red Hat, Inc. "Red Hat Command Center 3.18: Release Notes", 2007, 7 pages.
Final Office Action mailed Sep. 24, 2014 in U.S. Appl. No. 12/156,289.
Non-Final Office Action mailed Mar. 12, 2014 in U.S. Appl. No. 12/156,289.
Final Office Action mailed Oct. 11, 2013 in U.S. Appl. No. 12/156,289.
Non-Final Office Action mailed Mar. 18, 2013 in U.S. Appl. No. 12/156,289.
Final Office Action mailed Aug. 29, 2012 in U.S. Appl. No. 12/156,289.
Non-Final Office Action mailed Apr. 12, 2012 in U.S. Appl. No. 12/156,289.
Final Office Action mailed Jul. 19, 2011 in U.S. Appl. No. 12/156,289.
Non-Final Office Action mailed Feb. 8, 2011 in U.S. Appl. No. 12/156,289.
Advisory Action mailed Nov. 7, 2012 in U.S. Appl. No. 12/156,289.
Advisory Action mailed Dec. 27, 2013 in U.S. Appl. No. 12/156,289.
Advisory Action mailed Dec. 1, 2014 in U.S. Appl. No. 12/156,289.
Notice of Allowance mailed Mar. 25, 2015 in U.S. Appl. No. 12/156,289.

* cited by examiner

PROVISIONING NETWORK RESOURCES BASED ON ENVIRONMENT

RELATED APPLICATIONS

The present application cross references U.S. patent application Ser. No. 12/156,289, entitled "Provisioning Network Resources by Environment and Network Address," and filed on May 30, 2008.

TECHNICAL FIELD

Embodiments of the present invention relate to networked computers, and more specifically to provisioning networked computers by environment.

BACKGROUND

Networked computers are used to transmit and fetch information to and from local sources (e.g., computers used in a business) and remote sources (e.g., enterprise services offered over the Internet). One exemplary network computer is a network appliance that is placed on a customer network to monitor devices of the customer network. While performing its intended operations, the network appliance can communicate with different components of a service provider's system. These components may include, for example, a web server providing user interfaces (UIs) to the customer network's IT administrator and other users, a backend server receiving monitoring data from the network appliance and generating alerts and various reports, a database server storing monitoring data in a database, etc.

A network appliance can operate in the production environment by default. However, the service provider usually develops and deploys its services in many other environments. For example, the service provider may develop its services in the development environment, test its services in the quality assurance (QA) environment, and deploy its services in the staging environment or the production environment. When the network appliance designated to operate in the production environment by default is used in a different environment, the network appliance needs to be manually switched to the different environment. As with any manual operation, the above switching of the network appliance is prone to human errors, is inefficient, and creates inconvenience for users.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1A:
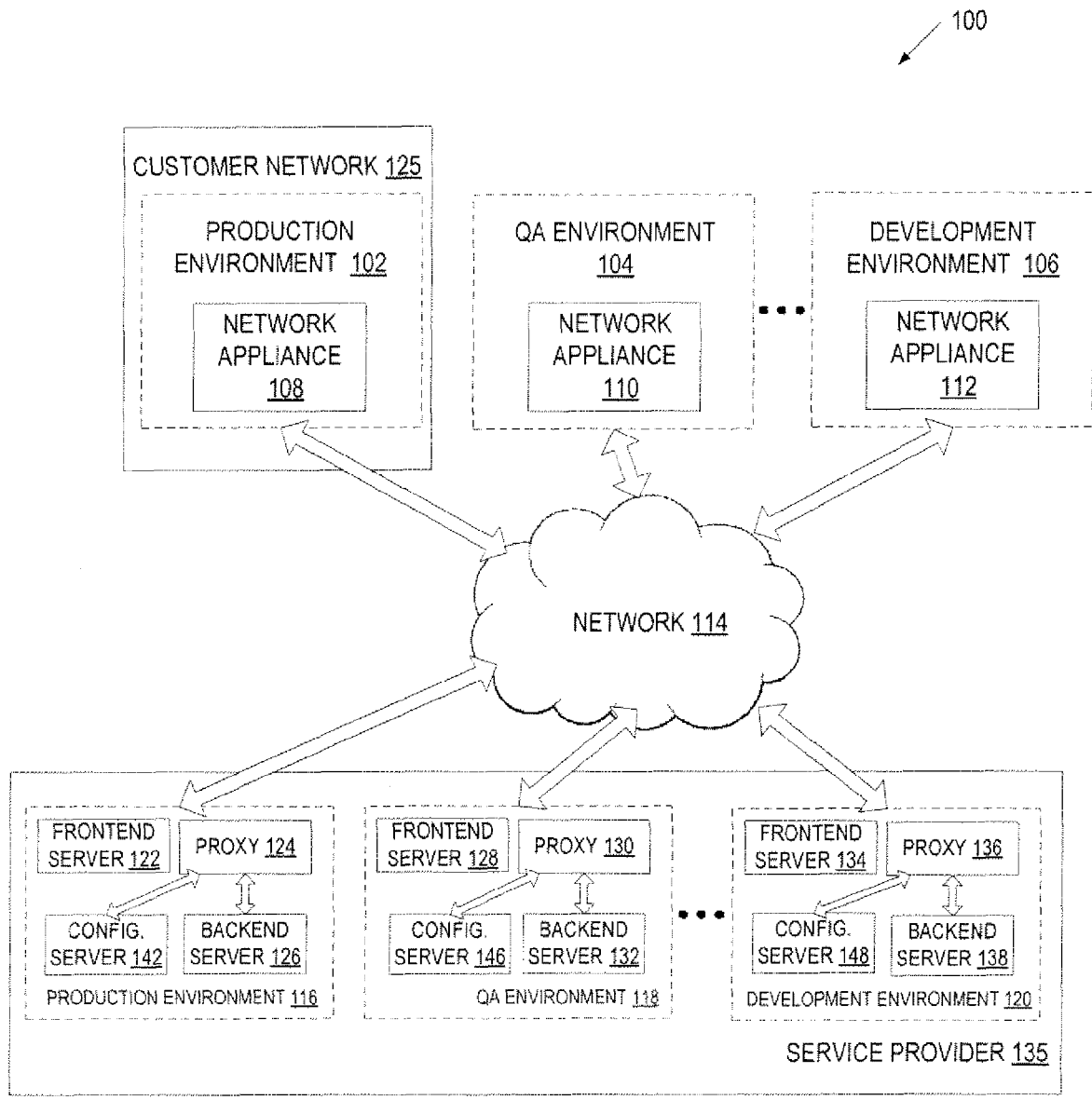
FIG. 1A illustrates an exemplary network architecture in which embodiments of the present invention may operate.

Described herein is a method and system for provisioning networked devices based on different environments. In one embodiment, a network appliance sends a configuration request to multiple different servers, each of which is associated with a different environment. The different environments may include, for example, a production environment, a quality assurance (QA) environment, a development environment, a staging environment, etc. In one embodiment, configuration requests are sent to each of the servers concurrently. Alternatively, configuration requests may not be sent to subsequent servers until a request times out or a response denying access is received. A response is received from at least one server. Each received response includes configuration data that pertains to an environment associated with the server from which the response is received. If multiple responses are received, the responses are prioritized, and the response having the highest priority is selected. The network appliance is then configured based on the configuration data included in the selected (or only) response to enable the network appliance to operate in the environment associated with the server from which the response originated.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1A illustrates an exemplary network architecture 100, in which embodiments of the present invention may operate. The network architecture 100 may include a service provider 135 connected with a customer network 125 (e.g., a local area network (LAN), wide area network (WAN), intranet, etc.) over a public network 114 (e.g., the Internet). Alternatively, the customer network 125 may be connected with the service provider 135 via a private network (e.g., an intranet, virtual private network (VPN), etc.).

Referring to FIG. 1A, the customer network 125 may represent a network of an enterprise and may include such devices as desktop computers, laptop computers, network printers, switches, routers, gateways, firewalls, or any other devices having a network address. In one embodiment, the customer network 125 also includes a network appliance 108. The network appliance 108 is a device that is configurable over a network. The network appliance 108 may be a computing device such as, for example, a desktop computer, laptop computer, server, etc. The network appliance 108 may be placed in the customer network 125 to perform functions related to network monitoring upon connection with the customer network 125.

Service provider 135 provides one or more services to customer network 125. In one embodiment, service provider 135 uses the network appliance 108 to collect information about the customer network 125 and devices on the customer network 125. The service provider 135 then analyzes this information, and generates alerts or presents the analysis to a user such as an IT administrator. Alternatively, the service provider 135 may provide other services, such as network indexing service, etc.

The service provider 135 may develop and deploy its services in several different environments including, for example, a production environment 116, a QA environment 118, a development environment 120, and a staging environment (not shown). Each environment may have its own set of servers responsible for facilitating monitoring operations pertaining to devices in a given environment.

The devices of the customer network 125 operate in production environment 102. In addition, the development and testing of the service provider's services is accomplished using devices operating in QA environment 104, development environment 106, and staging environment (not shown). These environments may be part of the service provider's network and/or some external network(s) coupled to the service provider 135 via a public or private network. For example, QA environment 104 may be a part of QA environment 118 and development environment 106 may be part of development environment 120. In one embodiment, devices in a particular subnet are assigned to a given environment, with each subnet having a unique network ID (a binary sequence with which addresses of all nodes in the subnet start). Each environment may have one or more network appliances intended to perform monitoring operations in the relevant environment (e.g., network appliances 110 through 112).

A set of the service provider's servers in each environment maintained by the service provider 135 may include, for example, a frontend server, a proxy server, a backend server and a configuration server that may reside on the same or different devices. Alternatively, other server configurations may be implemented (e.g., a specific environment of service provider 135 may include more or fewer servers, which may have redundant or different functionality).

Frontend servers 122, 128 and 134 may provide interfaces to clients in respective environments. Through the frontend servers, users of client devices may request data, initiate actions, receive information, etc. Network appliances 108, 110 and 112 may also communicate with frontend servers 122, 128 and 135, respectively, to request a service, initiate an action, report data, etc. Frontend servers may be web application servers that provide web application interfaces accessible to clients via a web browser. Backend servers 126, 132 and 138 may communicate with network appliances 108, 110 and 112, respectively, to send and/or receive such data as identity certificate information, network status updates, transactions, etc. Backend servers may operate in the background, and may not include a user interface or be addressable by a user.

Configuration servers 142, 146, 148 are servers that provide configuration information to network appliances. In one embodiment, the configuration servers are hypertext transfer protocol daemons (HTTPd), such as the Apache web server. Each configuration server 142, 146, 148 stores configuration information for a specific environment in which the configuration server operates. The configuration information may include, for example, internet protocol (IP) addresses, host names and universal resource locators (URLs) of servers operating in a particular environment. For example, configuration server 142 is associated with the production environment 116 and may provide IP addresses, host names and URLs of frontend server 122, proxy 124 and backend server 126. Similarly, configuration server 146 is associated with the QA environment 118 and may provide IP addresses, host names and URLs of frontend server 128, proxy 130 and backend server 132, and so on.

Network appliances may send configuration requests directly to the configuration servers 142, 146, 148. Alternatively, network appliances 108, 110, 112 may send configuration requests to the frontend server 122, 128, 134 or to the backend server 126, 132, 138. Configuration servers 142, 146 148 may send responses to the network appliance from which the configuration request is received. The network appliance may then be configured based on the configuration data included in one of the responses.

Each backend server and/or configuration server may communicate with a respective network appliance through a proxy server (e.g., proxy server 124, 130 or 136). A proxy server receives transmissions and, if appropriate, forwards them to a corresponding backend server and/or configuration server. Alternatively, no proxy server may be present, or multiple proxy servers may be used.

In one embodiment, the QA environment 118, development environment 120 and staging environment (not shown) are behind firewalls that block incoming configuration requests. Therefore, a network appliance may only receive a response from a configuration server of the QA environment 118, for example, if the network appliance is behind the firewall (e.g., deployed in the QA environment 118). In one embodiment, proxy server 130 and proxy server 136 (as well as a proxy server of the staging environment) include a firewall that filters configuration requests. Each firewall may include an access control list that passes configuration requests that originate from particular network addresses (e.g., IP address) and block all other configuration requests.

For example, proxy server 130 may include a firewall that passes a configuration request received from network appliance 110 in QA environment 104, but blocks configuration requests from network appliance 108 and network appliance 112. Proxy server 124 of production environment 116 may pass all configuration requests.

In a further embodiment, the proxy server may perform a reverse name lookup on the network address of the network appliance from which the configuration request is received. Based on the reverse name lookup, the proxy server may determine a specific host name associated with the network appliance. The proxy server may pass or block the configuration request based on the resolved host name. For example, all network appliances in the QA environment may resolve to mpqa.com, and the proxy server may pass any configuration requests that resolve to *.mpqa.com.

In one embodiment, network appliances communicate with servers in the various environments using HTTP. Alternatively, network appliances may communicate with servers in the environments using one or more proprietary protocols. In such an embodiment, a firewall operating on the proxy server may include rules that block or pass configuration requests. For example, assume that a server uses a proprietary communication protocol that operates on port 2011. The server listens on port 2011 for configuration requests from network appliances. A set of firewall rules are used to check to see if traffic comes that comes in from port 2011 originates from one of a set of network addresses. If it does, then a connection is established. Otherwise, the firewall blocks the connection.

Figure 1B:
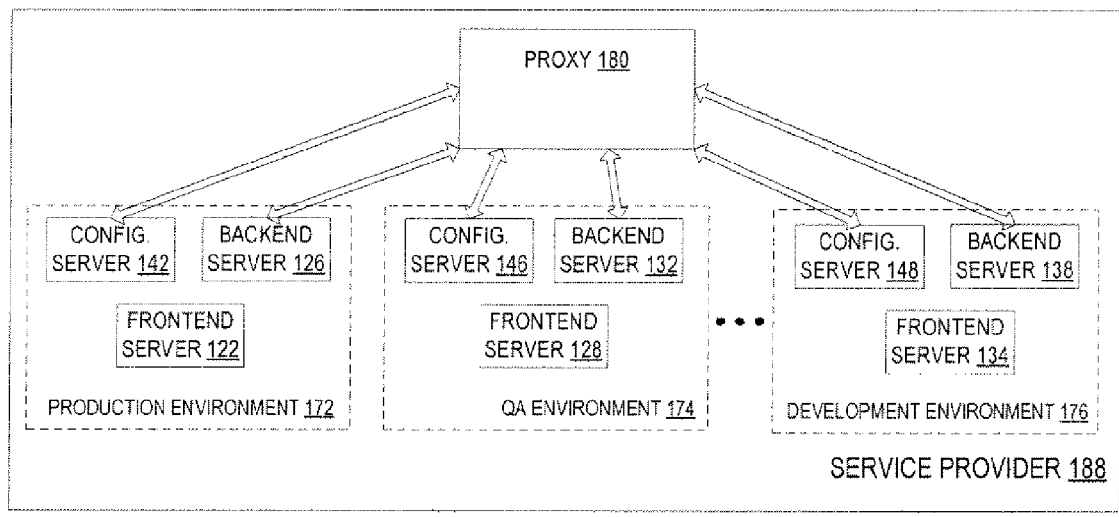
FIG. 1B illustrates a block diagram of a service provider, in accordance with one embodiment of the present invention.

FIG. 1B illustrates a block diagram of a service provider 188 that may be a part of network architecture 100 of FIG. 1A, in accordance with one embodiment of the present invention. Service provider 188 includes multiple different environments, such as a production environment 172, a QA environment 174, a staging environment (not shown) and a development environment 176. Each environment may include a configuration server 142, 146, 148 a backend server 126, 132, 138 and a frontend server 122, 128, 134. The service provider 188 may also include a proxy server 180 through which the configuration servers 142, 146, 148 and/or backend servers 126, 132, 138 of each environment communicate with network appliances.

In one embodiment, when the proxy server 180 receives a configuration request, it determines a network address from which the request originated, and forwards the request to a backend server of an environment that corresponds to the network address. Therefore, each environment 172, 174, 176 may only receive configuration requests from appliances that are in a corresponding environment.

Figure 2A:
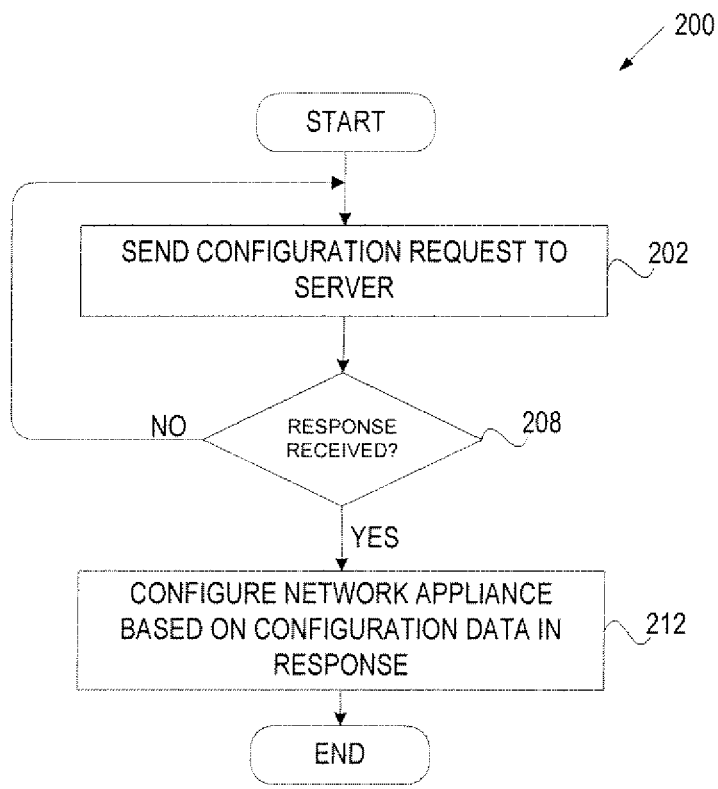
FIG. 2A is a flow diagram illustrating one embodiment of a method for provisioning a network appliance based on environment.

FIG. 2A is a flow diagram illustrating one embodiment of a method 200 for provisioning a network appliance based on environment. The method may be performed by processing logic (that can be executed by the network appliance) that may comprise hardware (e.g., circuitry, dedicated logic, programmable logic, microcode, etc.), software (e.g., instructions run on a processing device to perform hardware simulation), or a combination thereof. In one embodiment, the method 200 is performed by a network appliance, such as network appliance 108, network appliance 110 or network appliance 112 of FIG. 1A.

A network appliance placed in a specific environment should perform monitoring of devices operating in this environment. To perform such monitoring, the network appliance should interact with a set of servers from an appropriate environment within a service provider's system. However, a network appliance may be preconfigured to operate in a default environment (e.g., production environment) and may need to switch to a different environment to reflect an environment in which the network appliance is located. Alternatively, a network appliance may not be preconfigured for any default environment, and may need configuration information. In order to obtain configuration information, a network appliance may send out configuration requests.

Referring to FIG. 2A, at block 202 a network appliance sends a configuration request to a configuration server associated with a particular environment. Examples of environments in which configuration servers may reside include a production environment, a QA environment, a staging environment and a development environment. Other environments are also possible.

At block 208, the network appliance determines whether a response to the configuration request has been received. If the network appliance receives a response from the server in the particular environment, it then stops sending out configuration requests, and continues to block 212. If no response is received in a specified time period (e.g., the request times out), or a response stating that access is denied is received, then the method returns to block 202 and the network appliance sends a configuration request to another environment.

In one embodiment, the network appliance queries (sends a configuration request to) the production environment only after failing to receive a response from all of the other environments. In another embodiment, the network appliance sends out configuration requests to environments in the following order: 1) development environment, 2) QA environment, 3) staging environment, 4) production environment.

If at block 208 a response to the configuration request is received, the method continues to block 212. The response to the configuration request includes configuration data that pertains to the environment from which the response originated. The configuration data may include, for example, a network address, URLs, host names etc. of a proxy server, backend server and/or frontend server that operate in the environment. At block 212 the network appliance configures itself using configuration information included in the response. The method then ends.

Figure 2B:
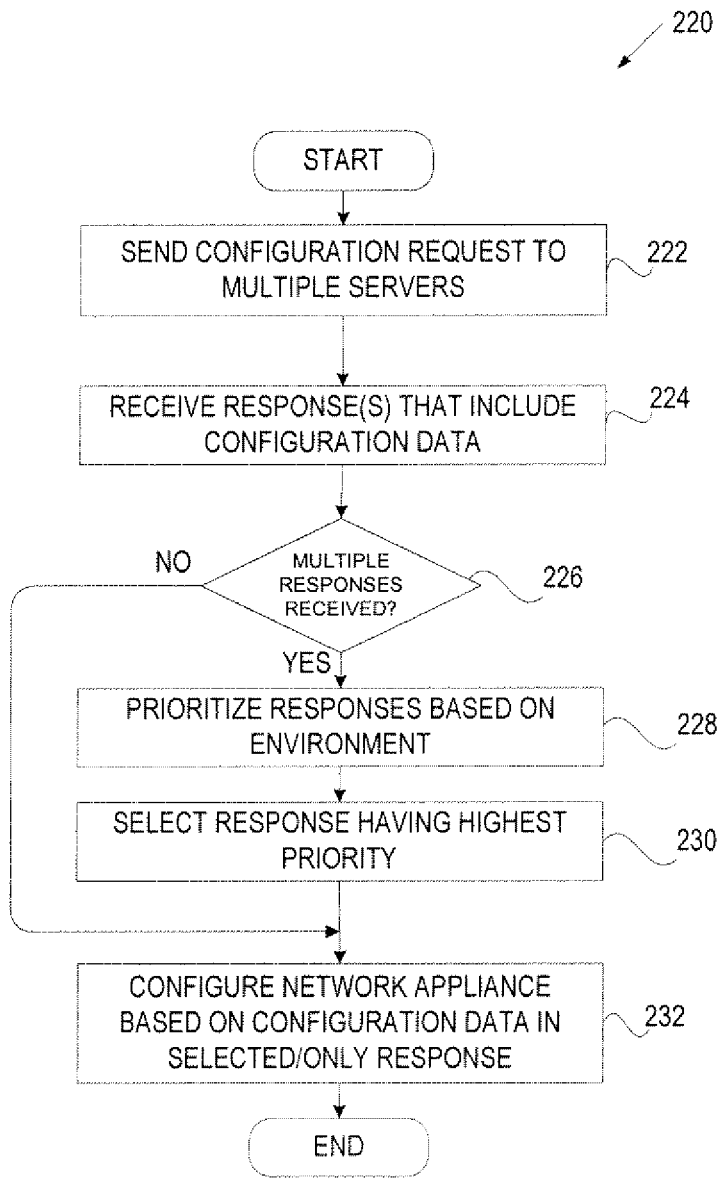
FIG. 2B is a flow diagram illustrating another embodiment of a method for provisioning a network appliance based on environment.

FIG. 2B is a flow diagram illustrating another embodiment of a method 220 for provisioning a network appliance based on environment. The method may be performed by processing logic (that can be executed by the network appliance) that may comprise hardware (e.g., circuitry, dedicated logic, programmable logic, microcode, etc.), software (e.g., instructions run on a processing device to perform hardware simulation), or a combination thereof. In one embodiment, the method 220 is performed by a network appliance, such as network appliance 108, network appliance 110 or network appliance 112 of FIG. 1A.

Referring to FIG. 2B, at block 222 a network appliance sends configuration requests to multiple configuration servers, each being associated with a different environment. The network appliance sends the configuration requests to the multiple configuration servers without waiting for responses. For example, the network appliance may simultaneously or closely in time send configuration requests to servers in each of the environments.

At block 224, the network appliance receives one or more responses that include configuration data. Responses to the configuration requests may be received from servers in each environment. Alternatively, responses may be received from only one or a few of the environments. Some servers, for example, may only respond to configuration requests from network appliances having particular network addresses. The response includes configuration data that the network appliance can use to configure itself. Therefore, a network appliance may receive more than one response, and thus multiple sets of configuration data.

The configuration data in a response is particular to the environment from which the response was received. Therefore, it is important that the network appliance use the configuration data from the appropriate response. The appropriate response is the response that is received from an environment that corresponds to an environment in which the network appliance is to operate.

At block 226, the network appliance determines whether multiple responses have been received. If multiple responses are received, the method proceeds to block 228. If only one response is received, the method proceeds to block 232.

At block 228, the network appliance prioritizes the received responses based on environment. In one embodiment, the environments are ranked in the following order: 1) development environment, 2) QA environment, 3) staging environment, 4) production environment. In another embodiment, a network appliance in the QA environment, development environment or staging environment will receive up to two responses: one response from the production environment and another response from a respective one of the QA environment, development environment or staging environment. In such an embodiment, the development environment, QA environment and staging environment may be assigned a rank of 1, and the production environment may be assigned a rank of 2. Accordingly, if a network appliance receives a response from any of the QA environment, development environment or staging environment, it can be concluded that the network appliance is in the environment corresponding to the received response.

At block 230, the network appliance selects the response having the highest priority. For example, if a network appliance receives a response from the QA environment and the production environment, the network appliance may select the response received from the QA environment.

At block 232, the network appliance configures itself using the configuration data from the selected (or only) response. The method then ends.

Figure 3A:
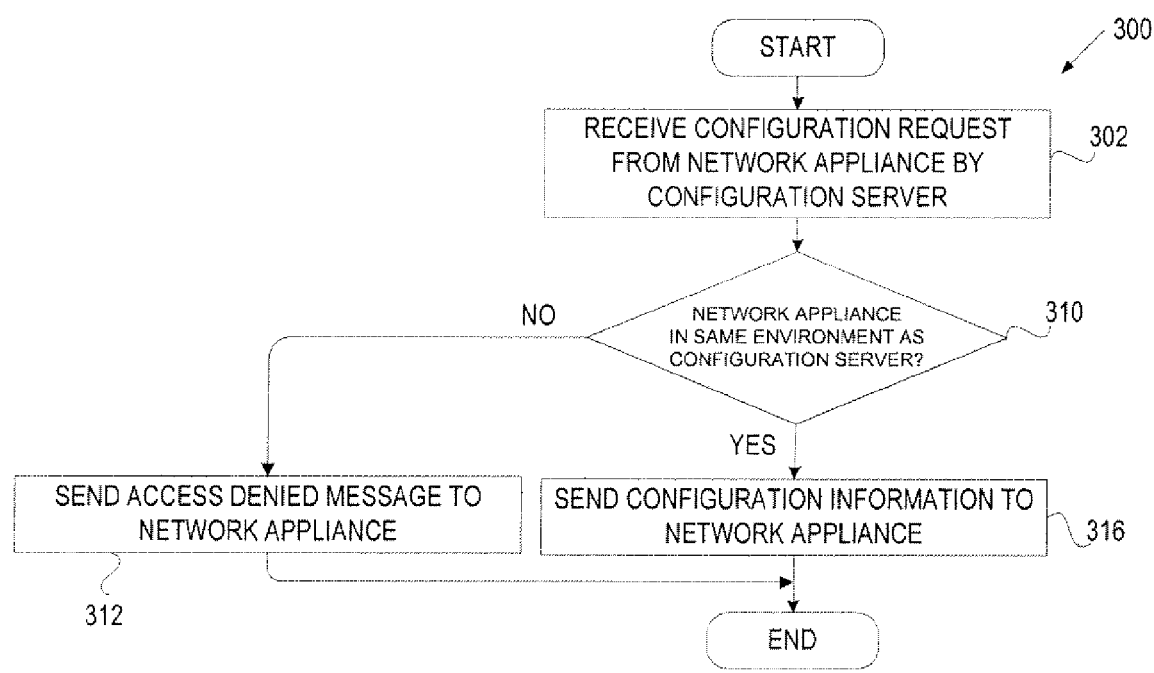
FIG. 3A is a flow diagram illustrating an embodiment of a method for facilitating provisioning of a network appliance based on environment.

FIG. 3A is a flow diagram illustrating an embodiment of a method 300 for facilitating provisioning of a network appliance based on environment. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a configuration server (e.g., configuration server 142, 146, 148) of FIG. 1A or 1B.

Referring to FIG. 3A, at block 302 a configuration server receives a configuration request from a network appliance. The configuration server may be a configuration server in a production environment, a QA environment, a development environment, a staging environment, or some other environment. At block 310, the configuration server determines whether the network is in the same environment as the configuration server. Such a determination may be made based on a network address (e.g., IP address) of the network appliance from which the configuration request was received. If the network appliance is in the same environment as the configuration server, the method proceeds to block 316. If the network appliance is not in the same environment as the configuration server, the method proceeds to block 312. In one embodiment, if the configuration server is in a production environment, then the method continues to block 316 whether or not the network appliance is also in the production environment.

At block 316, the configuration server responds to the request by sending configuration information to the network appliance. At block 312, the configuration server responds to the request by sending an access denied message. Alternatively, the configuration server may not send any response to the network appliance, and the method may end.

Figure 3B:
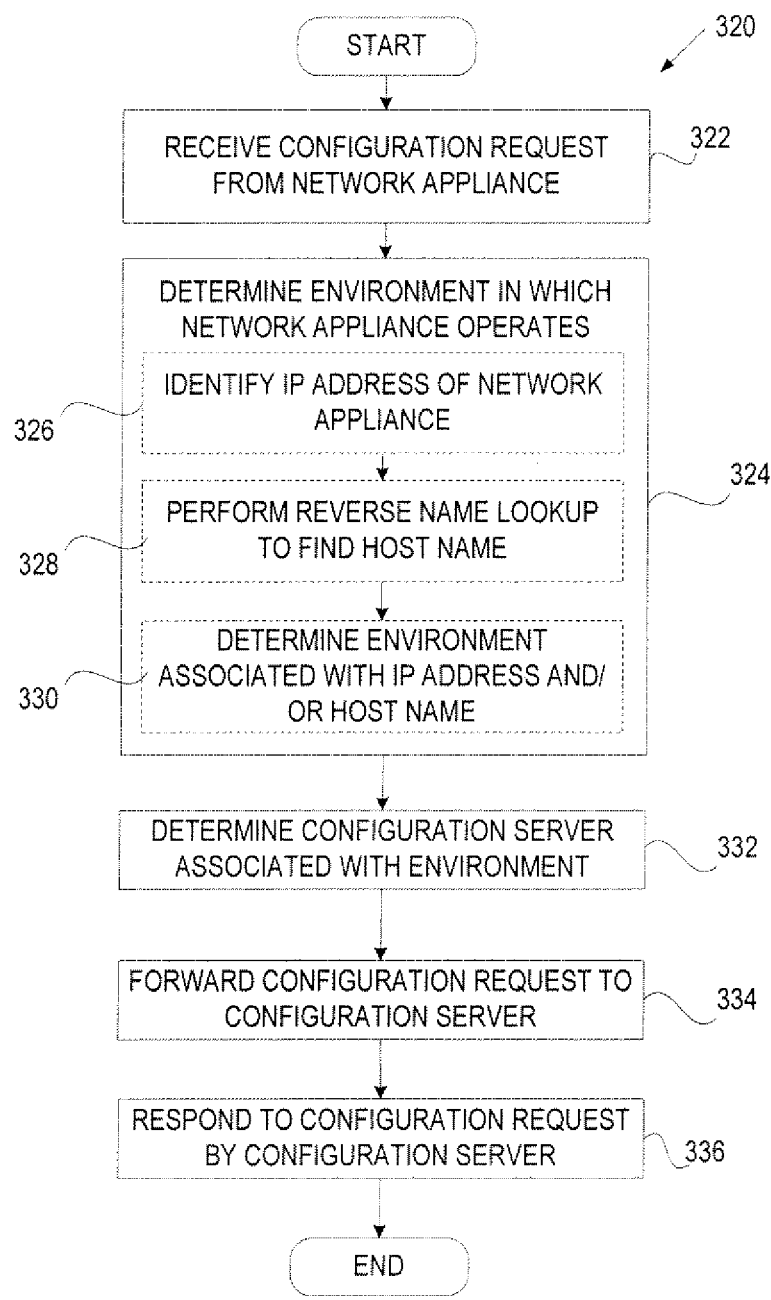
FIG. 3B is a flow diagram illustrating another embodiment of a method for facilitating provisioning of a network appliance based on environment.

FIG. 3B is a flow diagram illustrating another embodiment of a method 320 for facilitating provisioning of a network appliance based on environment. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 320 is performed by a configuration server and/or a proxy server, such as those shown in FIGS. 1A-1B.

Referring to FIG. 3B, at block 322 a proxy server receives a configuration request from a network appliance. At block 324, the proxy server determines an environment in which the network appliance operates. In one embodiment, determining the environment in which the network appliance operates is performed as shown in blocks 326, 328 and 330. At block 326, the proxy server identifies an IP address of the network appliance. At block 328, the proxy server performs a reverse name lookup to find a host name associated with the IP address. At block 330, the proxy server determines an environment associated with the IP address and/or host name.

At block 332, the proxy server determines a configuration server associated with the environment. At block 334, the proxy server forwards the configuration request to the determined configuration server. At block 336, the configuration server responds to the request by sending configuration data to the network appliance. The method then ends.

Though described as being performed by a proxy server, blocks 322 and 324 in one embodiment are performed by a configuration server. In such an embodiment, the actions of blocks 332 and 334 may not be performed.

Figure 4:
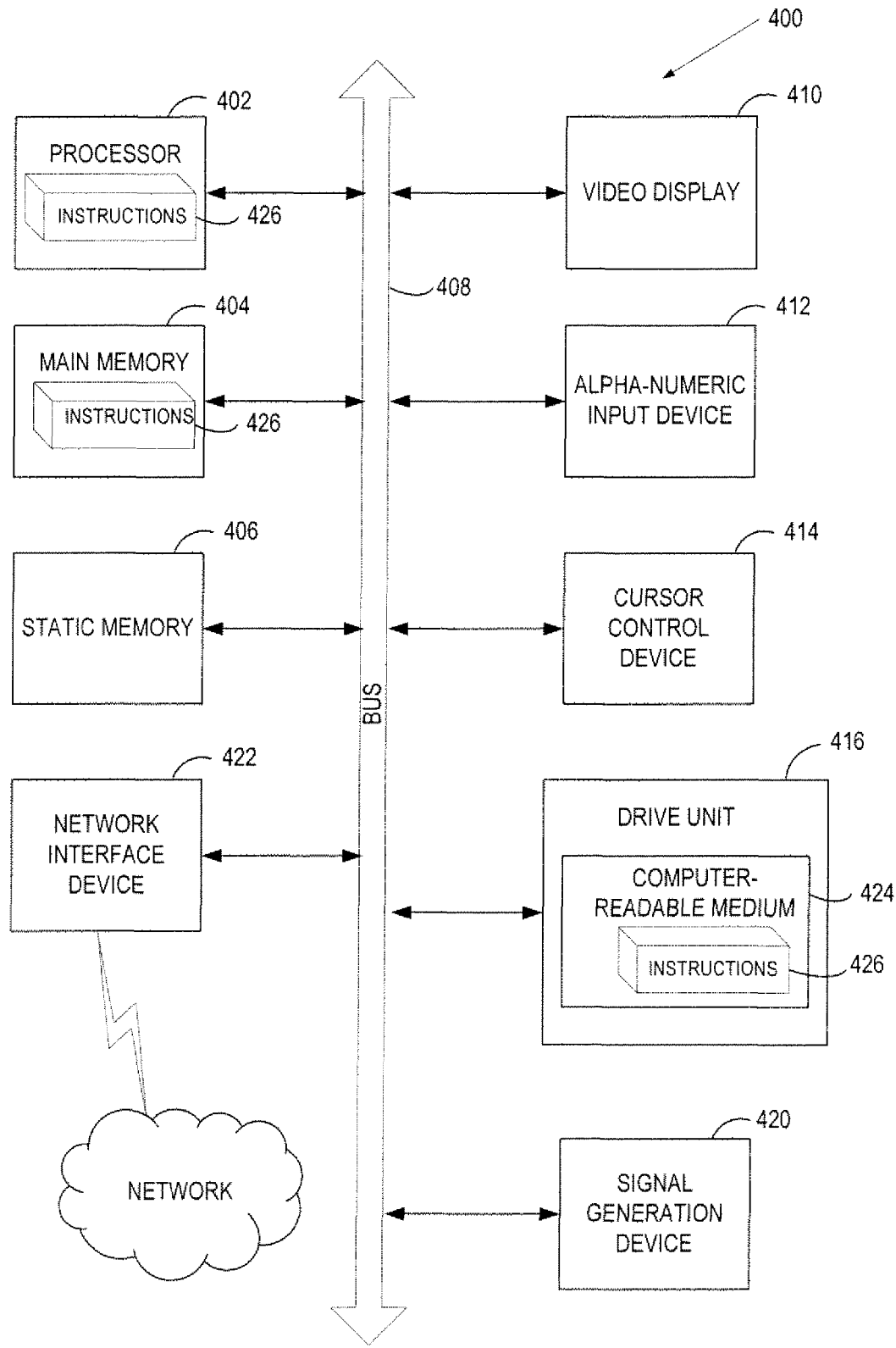
FIG. 4 illustrates a diagrammatic representation of a machine in the exemplary form of a computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    storing a prioritization rule that ranks a plurality of pre-defined environments, the plurality of pre-defined environments comprising at least two of a quality assurance environment comprising a first subnet, a development environment comprising a second subnet, a production environment comprising a third subnet or a staging environment comprising a fourth subnet;
    sending, by a processor, a configuration request to a plurality of servers by a network appliance, wherein each of the servers is associated with one of the plurality of pre-defined environments;
    after receiving, at the network appliance, responses from at least some of the plurality of servers, wherein each response comprises configuration data, determining an environment associated with a server from which each response was received, and prioritizing the responses using the prioritization rule in view of the determined environments associated with the servers from which responses were received; and
    configuring, by the processor, the network appliance in view of configuration data included in a response having a highest priority to cause the network appliance to collect information about a particular subnet in the environment associated with the server from which the response having the highest priority was received and about devices on the particular subnet, and to further cause the network appliance to provide the collected information to an additional server external to the particular subnet that provides a service for the environment associated with the server from which the response having the highest priority was received.

2. The method of claim 1 wherein the plurality of servers comprise one or more of a first configuration server associated with the production environment, a second configuration server associated with the staging environment, a third configuration server associated with the quality assurance environment and a fourth configuration server associated with the development environment.

3. The method of claim 1, further comprising:
    sending an additional configuration request to an additional server after failing to receive any response from the plurality of servers, wherein the additional server has a lower priority than the plurality of servers.

4. The method of claim 1 wherein sending the configuration request to the plurality of servers comprises, for each server of the plurality of servers, attempting to access the configuration data using a universal resource locator associated with the server.

5. A computer-readable storage medium that, when executed by a network appliance, causes the network appliance to:
    store a prioritization rule that ranks a plurality of pre-defined environments, the plurality of pre-defined environments comprising at least two of a quality assurance environment comprising a first subnet, a development environment comprising a second subnet, a production environment comprising a third subnet or a staging environment comprising a fourth subnet;
    prioritize, using the prioritization rule, by the network appliance, a plurality of servers in view of environments associated with the plurality of servers, wherein each server of the plurality of servers is associated with a different environment of the plurality of environments;
    send a configuration request to at least a highest priority server of the plurality of servers by the network appliance;
    receive, at the network appliance, responses from at least some of the plurality of servers, each response comprising configuration data;
    determine an environment associated with each server from which the responses were received;
    prioritize the responses using the prioritization rule in view of the determined environments associated with the servers from which responses were received; and configure the network appliance in view of configuration data included in a response having a highest priority to cause the network appliance to collect information about a particular subnet in the environment associated with the server from which the response having the highest priority was received and about devices on the particular subnet, and to further cause the network appliance to provide the collected information to an additional server external to the particular subnet that provides a service for the environment associated with the server from which the response having the highest priority was received.

6. The computer-readable storage medium of claim 5, wherein the plurality of servers comprise one or more of a first configuration server associated with the production environment, a second configuration server associated with the staging environment, the third configuration server associated with a quality assurance environment and a fourth configuration server associated with the development environment.

7. The computer-readable storage medium of claim 5, wherein the plurality of servers are queried one at a time in view of a priority established by the prioritizing, the operations further comprising:
   sending a first configuration request to a first server having the highest priority; and
   sending a subsequent configuration request to a next server having a lower priority if no response is received from the first server.

8. The computer-readable storage medium of claim 5, wherein sending the configuration request to the plurality of servers comprises, for each server of the plurality of servers, attempting to access the configuration data using a universal resource locator associated with the server.

9. A computing comprising:
   a network appliance that comprises a memory comprising:
      a prioritization rule that ranks a plurality of pre-defined environments, the plurality of pre-defined environments comprising at least two of a quality assurance environment comprising a first subnet, a development environment comprising a second subnet, a production environment comprising a third subnet or a staging environment comprising a fourth subnet; and
      instructions to perform configuration; and
   a processor, operatively coupled with the memory, to execute the instructions, wherein the instructions cause the processor to:
      send a configuration request to a plurality of servers, wherein each of the servers is associated with one of the plurality of pre-defined environments;
      after receiving responses from at least some of the plurality of servers, wherein each response comprises configuration data, determining an environment associated with a server from which each response was received, and prioritize the responses using the pre-defined prioritization rule in view of the determined environments associated with the servers from which the responses were received; and
      configure the network appliance in view of configuration data included in a response having a highest priority to cause the network appliance to collect information about a particular subnet in the environment associated with the server from which the response having the highest priority was received and about devices on the particular subnet, and to further cause the network appliance to provide the collected information to an additional server external to the particular subnet that provides a service for the environment associated with the server from which the response having the highest priority was received.

10. The computing system of claim 9, wherein the instructions to further to cause the processor to:
    send an additional configuration request to an alternative server after failing to receive any response from the plurality of servers, wherein the alternative server has a lower priority than the plurality of servers.

11. The computing system of claim 9, further comprising:
    a proxy server comprising an additional memory comprising additional instructions for responding to configuration requests and an additional processor, operatively connected with the additional memory, to execute the additional instructions, wherein the additional instructions cause the additional processor to:
       receive the configuration request from the network appliance;
       determine an environment in which the network appliance operates;
       determine a configuration server associated with the environment; and
       forward the configuration request to the configuration server; and
    the configuration server, operatively connected with the proxy server, to respond to the configuration request, the response comprising configuration data pertaining to the environment.

12. The computing system of claim 11, wherein determining the environment in which the network appliance operates comprises:
    identifying an internet protocol (IP) address of the network appliance; and
    determining an environment associated with the IP address.

13. The computing system of claim 12, wherein determining the environment in which the network appliance operates further comprises:
    performing a reverse name lookup to identify a host name associated with the IP address of the network appliance; and
    determining an environment associated with the host name.

* * * * *